United States Patent
Gan et al.

(10) Patent No.: US 9,938,143 B2
(45) Date of Patent: Apr. 10, 2018

(54) METHOD FOR PRODUCING HYDROGEN GAS FROM FORMIC ACID

(71) Applicant: GRANIT S.A., Orbe (CH)

(72) Inventors: Weijia Gan, St-Sulpice (CH); J. Paul Dyson, Ecublens (CH); Gabor Laurenczy, Lonay (CH)

(73) Assignee: GRT GROUP SA, Orbe (CH)

(*) Notice: Subject to any disclaimer, the term of this patent is extended or adjusted under 35 U.S.C. 154(b) by 33 days.

(21) Appl. No.: 14/772,944

(22) PCT Filed: Mar. 6, 2013

(86) PCT No.: PCT/CH2013/000034
§ 371 (c)(1),
(2) Date: Sep. 4, 2015

(87) PCT Pub. No.: WO2014/134742
PCT Pub. Date: Sep. 12, 2014

(65) Prior Publication Data
US 2016/0009553 A1 Jan. 14, 2016

(51) Int. Cl.
*B01J 31/02* (2006.01)
*B01J 31/24* (2006.01)
(Continued)

(52) U.S. Cl.
CPC ............ *C01B 3/22* (2013.01); *B01J 23/462* (2013.01); *B01J 31/0255* (2013.01);
(Continued)

(58) Field of Classification Search
None
See application file for complete search history.

(56) References Cited

U.S. PATENT DOCUMENTS

| 8,133,464 B2 | 3/2012 | Laurenczy et al. |
| 2011/0059378 A1* | 3/2011 | Chan ........... B01J 21/063 429/420 |
| 2014/0255296 A1* | 9/2014 | Beller ........... C01B 3/22 423/648.1 |

FOREIGN PATENT DOCUMENTS

| EP | 2 086 873 B1 | 3/2015 |
| WO | 2008/047312 A1 | 4/2008 |
| WO | 2012/143372 A1 | 10/2012 |

OTHER PUBLICATIONS

Weijia Gan et al: "Hydrogen Storage and Delivery: Immobilization of a Highly Active Homogeneous Catalyst for the Decomposition of Formic Acid to Hydrogen and Carbon Dioxide", Reaction Kinetics and Catalysis Letters, Springer Science + Business Media, Dordrecht, NL, vol. 98, No. 2, Nov. 7, 2009, pp. 205-213.
(Continued)

*Primary Examiner* — Colin W. Slifka
(74) *Attorney, Agent, or Firm* — Davis & Bujold PLLC; Michael J. Bujold

(57) ABSTRACT

A method for producing A hydrogen gas from formic acid, characterized in that at least one heterogeneous catalyst is used to transform the formic acid into hydrogen gas. The at least one heterogeneous catalyst contains heterogenized ruthenium. According to a first aspect of the invention, the at least one heterogeneous catalyst contains at least one hydrophilic phosphine ligand which is m-TPPTS (meta-trisulfonated triphenylphosphine). The at least one heterogeneous catalyst is preferably obtained by mixing an aqueous solution of $RuCl_3$ with hydrophilic phosphine, firstly activated by carrying out a homogeneous reaction with formic acid and by adding at least one solid structure.

10 Claims, 3 Drawing Sheets

(51) Int. Cl.
 *C01B 3/22* (2006.01)
 *B01J 23/46* (2006.01)
 *B01J 37/02* (2006.01)

(52) U.S. Cl.
 CPC ......... *B01J 31/0267* (2013.01); *B01J 31/24* (2013.01); *B01J 37/0209* (2013.01); *B01J 2531/821* (2013.01); *C01B 2203/0277* (2013.01); *C01B 2203/1047* (2013.01); *C01B 2203/1064* (2013.01); *C01B 2203/1211* (2013.01)

(56) References Cited

OTHER PUBLICATIONS

Miklos Czaun et al: Hydrogen Generation from Formic Acid Decomposition by Ruthenium Carbonyl Complexes. Tetraruthenium Dodecacarbonyl Tetrahydride as an Active Intermediate:, Chemsuschem, vol. 4, No. 9, Mar. 14, 2011, pp. 1241-1248.
International Search Report Corresponding to PCT/CH2013/000034 dated Sep. 10, 2013.
Written Opinion Corresponding to PCT/CH2013/000034 dated Sep. 10, 2013.

\* cited by examiner

METHOD FOR PRODUCING HYDROGEN GAS FROM FORMIC ACID

TECHNICAL FIELD

The present invention relates to a method for producing hydrogen gas from formic acid.

PRIOR ART AND THE PROBLEM UNDERLYING THE INVENTION

Hydrogen will certainly play a key role in the future because it has attractive properties as a clean energy carrier such as a high energy content, ca. 140 MJ/Kg and emissions consisting of water when combusted. At the present time hydrogen is mainly derived from fossil fuels, which is not a sustainable practice. A second issue is that hydrogen by itself is dangerous to handle and requires energy-intensive compression for storage and transport.

An alternative system would make use of formic acid as a prerequisite feedstock to hydrogen production. At ambient conditions formic acid is stable, non-toxic and can potentially be sourced from biomass or other sustainable resources.

The U.S. Pat. No. 8,133,464 (EP 2086873) discloses a method for producing hydrogen gas and carbon dioxide in a chemical reaction from formic acid, said reaction being conducted in an aqueous solution, in the presence of added formate salt and in the presence of a catalyst.

According to the disclosed invention, the method of producing hydrogen gas and carbon dioxide is performed in a chemical reaction from formic acid conducted in an aqueous medium at a pH of preferably 2.5-4.5, at a high $H_2$ partial pressure in presence of formate salt and a catalyst. The catalyst comprises a metal selected from Ru, Rh, Ir, Pt, Pd and Os and a ligand comprising at least one phosphorus atom being bound by a complex bond to said metal.

Working in an aqueous solution can be disadvantageous for a method of producing hydrogen gas from formic acid for small and mobile/transport applications, which has to be performed on an industrial basis.

SUMMARY OF THE INVENTION

The present invention provides a method for producing hydrogen gas from formic acid, said method meeting the objectives discussed and solving the problems of the prior art.

Therefore it is one objective of the present invention to produce hydrogen at higher efficiencies in chemical reactions using solid catalysts.

Therefore it is one objective of the present invention to produce hydrogen at higher efficiencies without performing a chemical reaction needing the presence of a catalyst in an aqueous solution.

It is another objective of the present invention to produce hydrogen gas in situ at a controlled rate for feeding a hydrogen consuming device directly, the amount of hydrogen gas produced corresponding to the amount of hydrogen gas to be consumed.

In a first aspect, the present invention provides a method for producing hydrogen gas from formic acid, characterized in that at least one heterogeneous catalyst is used to transform formic acid to hydrogen gas.

The said at least one heterogeneous catalyst may contain heterogenised ruthenium. Said at least one heterogeneous catalyst may also contain at least one hydrophilic phosphine ligand. Said at least one hydrophilic phosphine ligand is advantageously m-TPPTS (meta-trisulfonated triphenylphosphine).

The said at least one heterogeneous catalyst may be obtained by mixing an aqueous solution of $RuCl_3$ with hydrophilic phosphine, firstly activated by carrying out a homogeneous reaction with formic acid and by adding at least one solid structure.

In a second aspect the present invention provides a method for producing hydrogen gas from formic acid, in which said at least one heterogeneous catalyst contains modified silica support with phosphine ligands.

The linkers are advantageously prepared from the parent bromoalkenes and coupled with the $PPh_2$ nucleophile and the ligand is covalently bonded to the silica surface and the ruthenium phosphine complex is anchored in a later step.

In a third aspect the present invention provides a method for producing hydrogen gas from formic acid, in which said at least one heterogeneous catalyst contains phosphine-modified polystyrene having hydrophilic sulfonate groups onto the aromatic phenyl rings corresponding to the following formula (A):

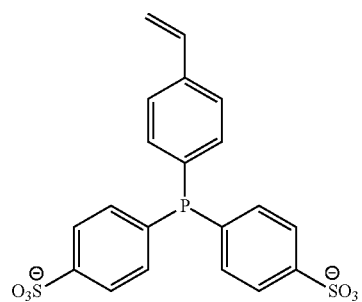

A

Said at least one heterogeneous catalyst contains preferably metal complex such as $[L_nRu(m-TPPTS)_2]$.

In a fourth aspect the present invention provides a method for producing hydrogen gas from formic acid, in which said at least one heterogeneous catalyst contains new phosphine architectures comprising charged groups such as an alkylated phosphatriazaadamantane (PTA) or bis(4-sulfonatophenyl)phosphine according to the formula: (B) and (C):

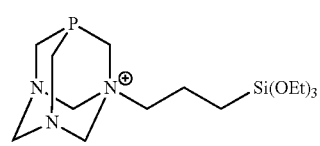

B

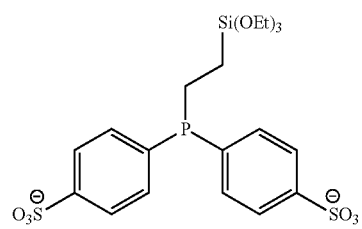

C

In a fifth aspect the present invention provides a method for producing hydrogen gas from formic acid, in which said at least one heterogeneous catalyst contains advantageously synthesized silica directly from tetraethylorthosilicate (Si(OEt)$_4$).

DETAILED DESCRIPTION OF THE PREFERRED EMBODIMENT

After a first development of homogeneous catalysts affecting the transformation of formic acid to hydrogen the present invention focuses on the study of heterogeneous catalysts to provide an industrial method with a high yield.

Initially, the investigations looked at simple absorption/adsorption processes to afford heterogenised ruthenium catalysts. To this effect, aqueous solutions of RuCl$_3$ were mixed with hydrophilic phosphine ligands such as m-TPPTS (meta-trisulfonated triphenylphosphine) and firstly activated by carrying out the homogeneous reaction with formic acid.

The solid catalysts used until now showed sluggish activity in the formic acid decomposition reactions, and only conversions of around 50% were achieved within an eight-hour period. It is thought that the hydrophobicity of the solid phase was great to allow diffusion of reactant molecules to the active sites, thereby hindering the dehydrogenation process. Incorporation of hydrophilic groups on the polymer could make the surface more hydrophilic, and these new ideas are detailed in a later section of this report.

Although several catalysts described until now demonstrated promising efficacy for the dehydrogenation of formic acid, all systems suffered from drawbacks such as ruthenium leaching or a gradual loss of activity. The ideal material would combine a stable solid support with a tightly bound ruthenium component, which exhibits high activity in this regard.

Figure 1:
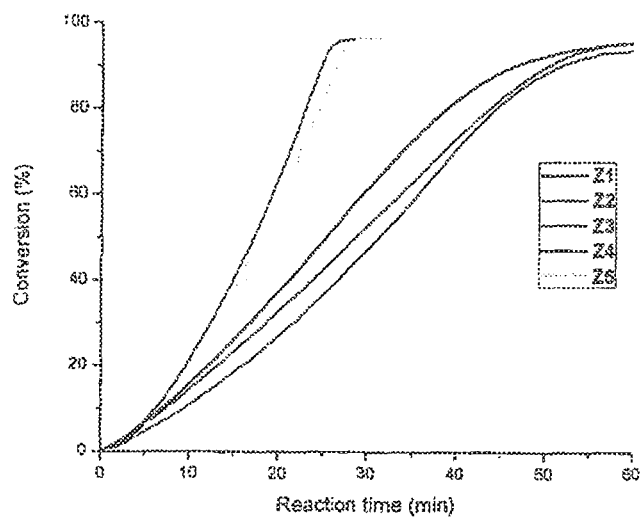
FIG. 1 represents a synthetic route yielding the immobilized Ru(II) catalyst C1-C4.

Such catalysts were developed using silica support modified with phosphine ligands as represented by FIG. 1, illustrating synthetic route yielding the immobilized Ru(II) catalysts C1-C4. Firstly, the linkers were prepared from the parent bromoalkenes and coupled with the PPh$_2$ nucleophile. Subsequently, the ligand was covalently bonded to the silica surface and the ruthenium phosphine complex was anchored in a later step. Four catalysts, denoted C1, C2, C3 and C4, were synthesised which differ by the length of the CH$_2$ spacer (n=1-4, respectively).

Figure 2:
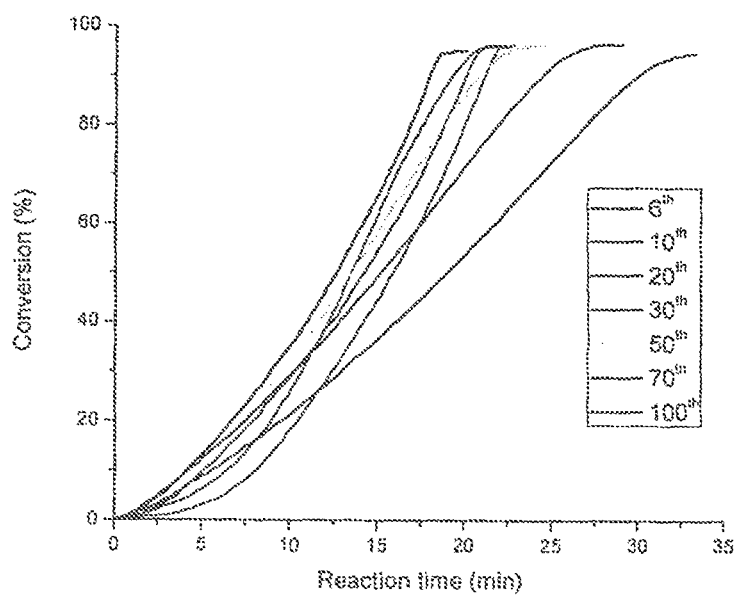
FIG. 2 represents the effect of different spaces lengths on formic acid decomposition catalysed with immobilized ruthenium catalyst C1-C4 compares to homogeneous Ru(II)/mTPPTS catalyst.

FIG. 2 illustrates the performance of the catalysts shown by FIG. 1 for the dehydrogenation process and compares the effect of different spacer lengths on formic acid decomposition catalysed with immobilized ruthenium catalyst C1-C4, compared to aqueous, homogeneous Ru(II)/m-TPPTS catalyst. 0.05 g immobilized ruthenium catalyst (or 56 mM RuCl$_3$ with 2 equivalents m-TPPTS for homogeneous catalyst), 10 M HCOOH/HCOONa (9/1) in 0.5 ml aqueous solution (H$_2$O/D$_2$O 1:1), 90° C.

While catalysts C3 and C4 are less effective than the homogeneous system Ru(II)/m-TPPTS, C1 and C2 have superior activity.

Recycling experiments were performed with the most successful catalyst, C2. It can be seen in FIG. 3 that the catalyst demonstrates no loss of activity over at least twenty cycles. Furthermore, upon removing the solid from the reactor and washing with water, no ruthenium leaching could be detected and the catalytic activity is not diminished.

Figure 3:
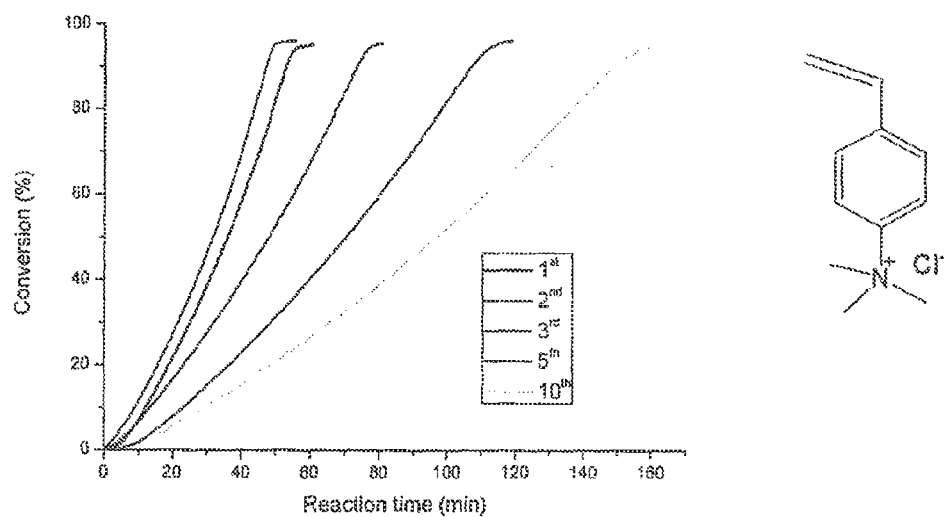
FIG. 3 represents kinetic curves of formic acid decomposition catalysed by C2.

FIG. 3 represents kinetic curves of formic acid decomposition catalysed by C2. 0.10 g C2, 10 M HCOOH/HCOONa (9/1) in 1 ml aqueous solution (H$_2$O/D$_2$O 1:1), 90° C., addition of 0.38 ml HCOOH for recycling.

Successful catalytic systems for the decomposition of formic acid into hydrogen are described above. Another of catalysts were developed high activity and stability.

One area in which improvements is made pertains to the phosphine-modified polystyrene. It was found that this material showed only poor efficacy in catalytic studies, presumably due to its hydrophobic nature. The introduction of hydrophilic sulfonate groups onto the aromatic phenyl rings would give monomer A shown in FIG. 4. A novel polystyrene containing well-defined proportions of bis(4-sulfonatophenyl)phosphine was prepared from this monomer. The hydrophobicity issue may also be overcome by introducing a metal complex such as [L$_n$Ru(m-TPPTS)$_2$].

Figure 4:
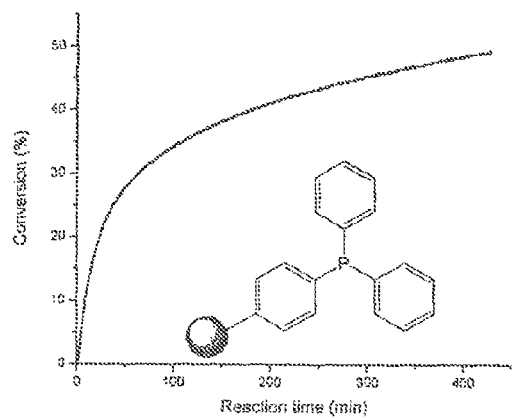
FIG. 4 represents selected synthetic targets for the synthesis of new solid-supported ruthenium-based catalysts.
Figure 5:
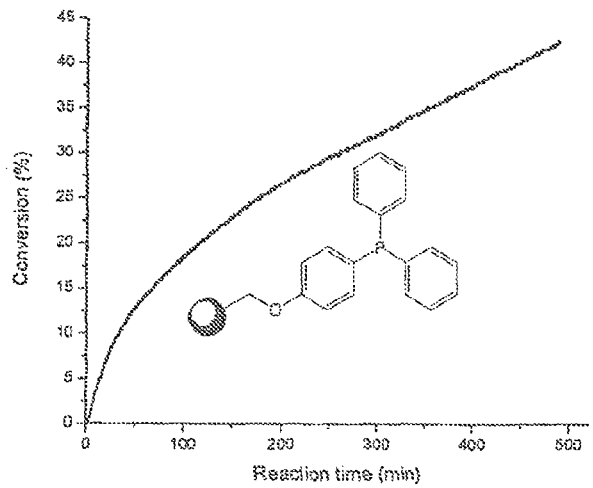
FIG. 5 represents a direct synthesis of mesoporous silica incorporating modified phosphine ligands.
Figure 6:
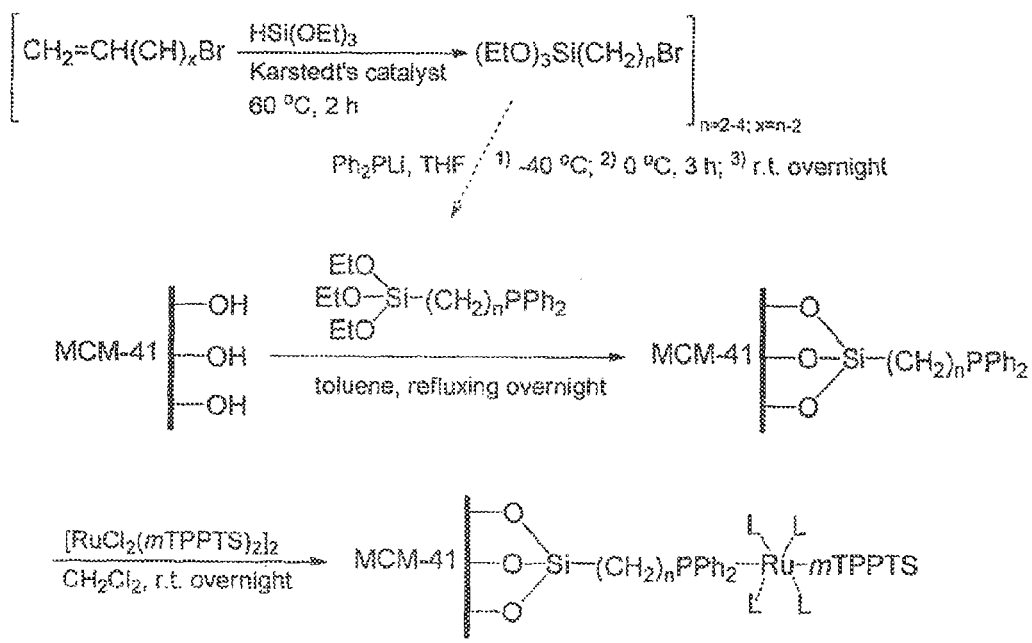
FIG. 6 shows other methods to synthetize silica supported Ru(II)-phosphine catalysts for selective formic acid decomposition, for hydrogen production.

FIGS. 4-6 shows selected synthetic targets for the synthesis of new solid-supported ruthenium-based catalysts.

As the most effective catalysts were based on silica supports, further work into materials of this type have also been explored. New phosphine architectures comprising charged groups such as an alkylated phosphatriazaadamantane (PTA) or bis(4-sulfonatophenyl)phosphine (B and C, respectively in FIG. 4) are synthetic targets. With a triethoxysilane functional group in place, these compounds are perfectly arranged to undergo surface modification on silica in a similar fashion as was discussed above.

Additionally, the possibility remains open to synthesize silica directly from the inexpensive tetraethylorthosilicate (Si(OEt)$_4$) and either B or C. The approach shown in FIG. 5 showing direct synthesis of mesoporous silica modified phosphorous ligands, has already been used to prepare functionalised silicates containing the diphenylphosphine ligand[2] and this may help to increase ruthenium loading in these catalysts.

The present invention has yielded promising catalysts for the selective decomposition of formic acid to hydrogen via solid-supported ruthenium catalysts. Other systems were studied, including zeolites, anion exchange resins, phosphine-modified polymers, and phosphine-modified silica gel. The latter regime is the most successful, affording catalysts that perform the desired reaction at a reasonable rate. Additionally, this material is very stable and recyclable, and the process is commercially viable.

Catalysts similar to the above-described ones are also prepared from other forms of silica. A solution of the metal complex Ru$_2$Cl$_4$(m-TPPTS)$_4$ was mixed with silica synthesized by the sol-gel method (FIG. 6, item 1). Additionally, a mixture of RuCl$_3$ and m-TPPTS can be used in lieu of the aforementioned metal complex (FIG. 6, item 2).

The sol-gel method was also been adapted to include RuCl$_3$ which is directly incorporated into the catalyst (FIG. 6, item 3).

Other methods of attaching metals centres to the silica support were studied. For example, a solution of RuCl$_2$ (PPh$_3$)$_3$ was firstly mixed with (EtO)$_3$SiCH$_2$CH$_2$PPh$_3$ and then MCM-41 (FIG. 6, item 4).

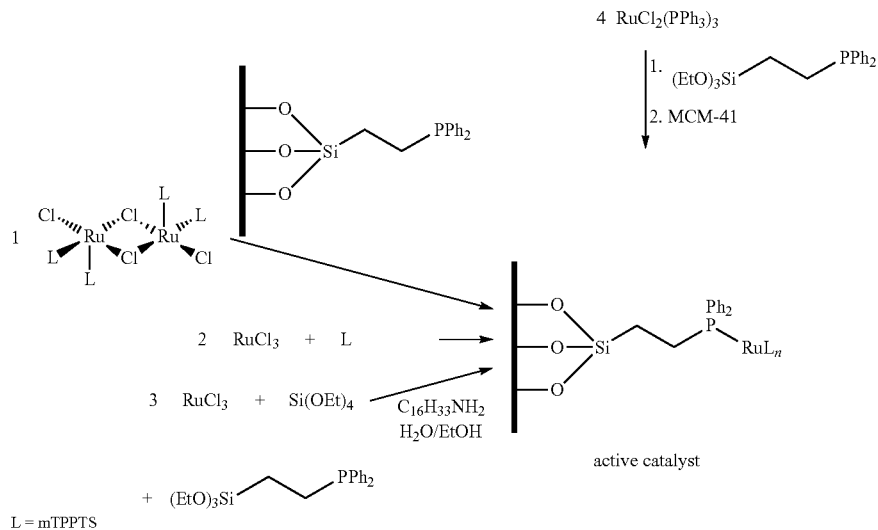

FIG. 6 shows other methods to synthetize silica supported Ru(II)-phosphine catalysts for selective formic acid decomposition, for hydrogen production.

The invention claimed is:

1. A method of producing hydrogen gas from formic acid, the method comprising:
    preparing a silica to support at least one heterogeneous catalyst by
        preparing linkers from parent bromoalkenes,
        coupling PPh2 nucleophile to a surface of the silica with the linkers,
        covalently bonding phosphine ligands to the silica,
        anchoring ruthenium phosphine complex to the silica; and
    using the at least one heterogeneous catalyst to transform formic acid to hydrogen gas.

2. The method according to claim 1, further comprising the at least one heterogeneous catalyst containing heterogenised ruthenium.

3. The method according to claim 1, further comprising the at least one heterogeneous catalyst containing at least one hydrophilic phosphine ligand.

4. The method according to claim 3, further comprising using m-TPPTS (meta-trisulfonated triphenylphosphine) as the at least one hydrophilic phosphine ligand.

5. The method according to claim 1, further comprising obtaining the at least one heterogeneous catalyst by mixing an aqueous solution of RuCl$_3$ with hydrophilic phosphine, firstly activated by carrying out a homogeneous reaction with formic acid and by adding at least one solid structure.

6. The method according to claim 1, further comprising the at least one heterogeneous catalyst containing phosphine-modified polystyrene having hydrophilic sulfonate groups on aromatic phenyl rings corresponding to the following formula (A):

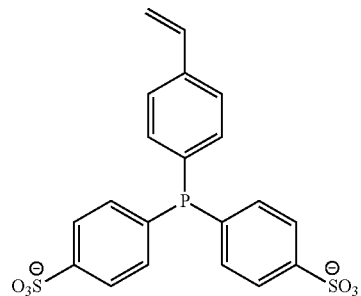

7. The method according to claim 6, further comprising the at least one heterogeneous catalyst containing a metal complex such as [LnRu(m-TPPTS)$_2$].

8. The method according to claim 1, further comprising the at least one heterogeneous catalyst containing polystyrene containing defined proportions of bis(4-sulfonatophenyl)phosphine.

9. The method according to claim 1, further comprising the at least one heterogeneous catalyst containing new phosphine architectures comprising charged groups such as an alkylated phosphatriazaadamantane (PTA) or bis(4-sulfonatophenyl)phosphine according to either of the following formulas (B or C):

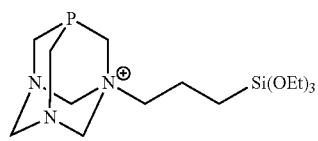

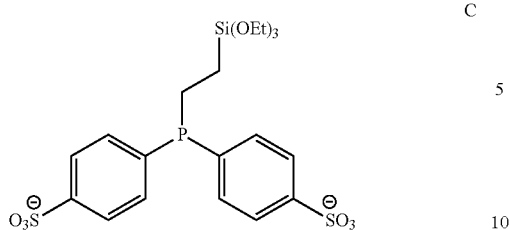
10. The method according to claim 1, further comprising the at least one heterogeneous catalyst containing synthesized silica directly from tetraethylorthosilicate (Si(OEt)$_4$).
* * * * *